United States Patent
Chen et al.

(10) Patent No.: US 12,087,105 B1
(45) Date of Patent: Sep. 10, 2024

(54) VEHICLE STATE ESTIMATION METHOD BASED ON ADAPTIVE TOTAL VARIATION DENOISING FILTERING

(71) Applicant: Tongji University, Shanghai (CN)

(72) Inventors: Hong Chen, Shanghai (CN); Lin Zhang, Shanghai (CN); Rongjie Yu, Shanghai (CN); Chunlai Zhao, Wuhan (CN); Jiaxing Lu, Shanghai (CN); Bin Li, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 18/372,719

(22) Filed: Sep. 26, 2023

(30) Foreign Application Priority Data

Mar. 17, 2023 (CN) .......................... 202310268376.X

(51) Int. Cl.
*G07C 5/08* (2006.01)
(52) U.S. Cl.
CPC .................................. *G07C 5/0808* (2013.01)
(58) Field of Classification Search
CPC .................................................... G07C 5/0808
See application file for complete search history.

(56) References Cited

PUBLICATIONS

He "Deep Denoising Autoencoding Method for Feature Extraction and Recognition of Vehicle Adhesion Status", 2018 (Year: 2018).*
Boudraa "Teager-Kaiser energy methods of signal and image analysis: A review," 2018 (Year: 2018).*

* cited by examiner

*Primary Examiner* — Aryan E Weisenfeld
(74) *Attorney, Agent, or Firm* — Bayramoglu Law Offices

(57) ABSTRACT

A vehicle state estimation method based on adaptive total variation denoising (TVD) filtering includes the following steps: step 1: collection and preprocessing of an original signal of a vehicle; step 2: noise level evaluation, step 3: Teager-Kaiser energy evaluation; step 4: optimization problem construction; and step 5: application of a filtered signal in the step 4 in the estimation of a vehicle state. The vehicle state estimation method is mainly based on the global noise level characteristic and the local intensity change characteristic of the vehicle system state data, and adaptive filtering of parameters is achieved by means of a TVD filtering method. The signal is denoised to the maximum extent, peak information of the signal is retained while the data smoothness is maintained, and then the signal is used for vehicle state estimation, working condition identification and the like.

1 Claim, 2 Drawing Sheets

VEHICLE STATE ESTIMATION METHOD BASED ON ADAPTIVE TOTAL VARIATION DENOISING FILTERING

CROSS REFERENCE TO THE RELATED APPLICATIONS

This application is based upon and claims priority to Chinese Patent Application No. 202310268376.X, filed on Mar. 17, 2023, the entire contents of which are incorporated herein by reference.

TECHNICAL FIELD

The present invention belongs to the technical field of vehicle signal filtering and state estimation, and relates to a filtering framework for signal restoration.

BACKGROUND

With the ever-improving intelligence and the electric degree of the vehicle system, the noise reduction method for the vehicle data is the concerns of more and more scholars. The traditional method for processing the vehicle data mainly includes low-pass filtering, high-pass filtering, band-pass filtering and the like, all of which can play a very significant role in data noise reduction. However, peak information of the data is usually lost while the smoothness of the data is improved.

Due to the driving characteristics of the vehicle and the road characteristics, the vehicle data shows certain sparsity, and the effect of the above filtering methods on the sparse data needs to be improved. Total variation denoising (TVD) is a filtering method developed for sparse data, which converts filtering into an optimization problem by establishing an objective function, thereby implementing filtering of sparse data. The current vehicle data filtering methods mainly have the following problems:

(1) The traditional filtering method is difficult to retain the peak information of the data while improving the data smoothness and denoising, but the peak information of the data plays very important roles in determining the safety threshold of the vehicle and identifying the vehicle state; and (2) The TVD filtering method is very suitable for noise reduction processing of sparse data, but because the signal intensity and the noise level of the data change in real time in the process of data generation, and particularly, the data characteristics under an extreme working condition have a large difference with the general working condition, how to evaluate the difference of the working condition and the method for achieving adaptive filtering for the local characteristics of the vehicle system data are generally lacked in the current filtering methods.

SUMMARY

The method of the present invention is mainly based on the global noise level characteristic and the local intensity change characteristic of the vehicle system state data, and adaptive filtering of parameters is achieved by means of a total variation denoising (TVD) filtering method. The method is characterized in that a Teager-Kaiser energy evaluation method is used to evaluate the noise level of a signal, noise reduction processing is performed on the signal by setting a noise index threshold & and an arithmetic mean filter mode, and the case that the signal has a good noise level when an energy-based adaptive parameter is solved is guaranteed. Then, the energy-based adaptive parameter of the signal is solved, and in combination with a noise-based adaptive parameter, an optimization problem is constructed. The optimization problem is solved to obtain a filtered signal, the signal is denoised to the maximum extent, peak information of the signal is retained while the data smoothness is maintained, and then the signal is used for vehicle state estimation, working condition identification and the like.

Provided is a vehicle state estimation method based on adaptive total variation denoising (TVD) filtering, which includes the following steps:

step 1: collection and preprocessing of an original signal of a vehicle firstly, for a typical working condition of a vehicle test, collecting, by using sensors, a vehicle speed, an acceleration, a wheel speed, a yaw rate, a motor torque data, etc. of the vehicle, meanwhile, solving a first-order difference $f_1$ of a signal P, wherein a solving formula is $f_1(n)=|p(n)-p(n-1)|$, and providing a data source for the subsequent steps 2, 3 and 4; step 2: noise level evaluation 2.1. noise level evaluation and noise-based adaptive parameter solution calculating a second-order difference $f_2$ of the signal according to the first-order difference J of the signal in the step 1, wherein a calculation formula is $f_2(n)=|(n)-f_1(n-1)$, performing noise level evaluation on the signal based on the second-order difference f of the signal, wherein an evaluation formula is $$K_n = \sum_{n=0}^{N-1} |f_2(n)|,$$

acquiring a noise-based adaptive parameter K(n), and providing a weight coefficient for a smoothness constraint term in the optimization problem in the step 4; and 2.2. noise index threshold setting according to the second-order difference f of the signal in the step 2.1, solving $I_n=\text{AVG}(|f_2|)$ to obtain a noise index $I_n$; setting a threshold c, when the noise index $I_1$ of the signal is greater than the threshold c, performing arithmetic mean filter on the signal, and then re-executing the step 2.1, and if the noise index of the signal is smaller than the threshold c, directly entering the step 3;

step 3: Teager-Kaiser energy evaluation according to the signal subjected to the noise level evaluation in the step 2 and having the noise threshold e, comprehensively evaluating an amplitude effect and an instantaneous frequency of the signal by using a Teager-Kaiser energy evaluation method, constructing an energy-based adaptive parameter $$K_e(n) = \frac{1}{TKE(f_1(n))}$$

according to a Teager-Kaiser energy value $TKE(f_1)$, and also providing the weight parameter for the signal smoothness constraint term in the optimization problem in the step 4;

step 4: optimization problem construction constructing the optimization problem according to the first-order difference $f_1$ of the signal in the step 1, the noise-based adaptive parameter $K_n$ in the step 2 and the energy-based adaptive parameter $K_e(n)$ in the step 3, and solving the optimization problem to obtain the filtered signal:

$$\arg\min_{y\in R^N}\left\{\frac{1}{2}\sum_{n=0}^{N-1}(x(n)-y(n))^2 + KK_n\sum_{n=1}^{N-1}K_e(n)|y(n)-y(n-1)|\right\}$$

wherein y is the filtered signal; K is a regularization parameter; a first term of the formula is a signal fidelity penalty, a second term is a signal smoothness penalty, and the regularization parameter K is used for achieving the balance between signal fidelity and signal smoothness;

wherein the steps 1-4 are key innovation points of the present invention; and step 5: application of a filtered signal in the step 4 in the estimation of a vehicle state. The step is of the prior art.

Specifically, the step 5 is described with the application example of estimating the road slope angle:

5.1. State Vector Construction and Parameter Initialization

Firstly, a state vector X is constructed based on a vehicle state signal y and the original signal of the vehicle required by a vehicle keyboard in the step 1, and parameter initialization setting of a Kalman model is completed.

5.2. Model State Update

The model state is predicted according to a state equation of the vehicle system, wherein the state equation is as follows:

$$\tilde{X}_k = A\hat{x}_{k-1} + Bu_{k-1} + w_{k-1}$$

wherein $\hat{x}_{k-1}$ is an optimal estimation of the system state at moment k−1; $\tilde{x}_k$ is a system parameter predicted value at moment k; A is a process matrix; $u_{k-1}$ is a control variable at moment k−1, B is a control matrix; $w_{k-1}$ is process noise and is usually set as white Gaussian noise for a variance Q.

A covariance matrix $P_k$ of the prediction process is calculated, and the calculation formula is as follows:

$$\overline{P}_k = AP_{k-1}A^H + Q$$

wherein $P_{k-1}$ is a covariance for the optimal state estimation at moment k−1.

5.3. State Measurement Update

A Kalman gain is calculated, and the calculation formula is as follows:

$$K_k = \overline{P}_k H^T (H\overline{P}_k H^T + R)^{-1}$$

wherein H is a measurement matrix; R is a variance for measuring white noise $V_{k-1}$.

The state $X_k$ is updated, and the calculation formula is as follows:

$$\hat{x}_k = \tilde{x}_k + K_k(z_k - H\tilde{x}_k)$$

wherein $z_k$ represents a measurement variable.

A covariance matrix $P_k$ of the measurement process is updated, and the update formula is as follows:

$$P_k = (1 - K_k H)\overline{P}_k$$

The vehicle state $X_k$ is output to complete the vehicle state estimation process, and meanwhile, the vehicle state $X_k$ and the covariance matrix P are output to the step 5.2 for cyclic execution.

DETAILED DESCRIPTION OF THE EMBODIMENTS

Figure 1:
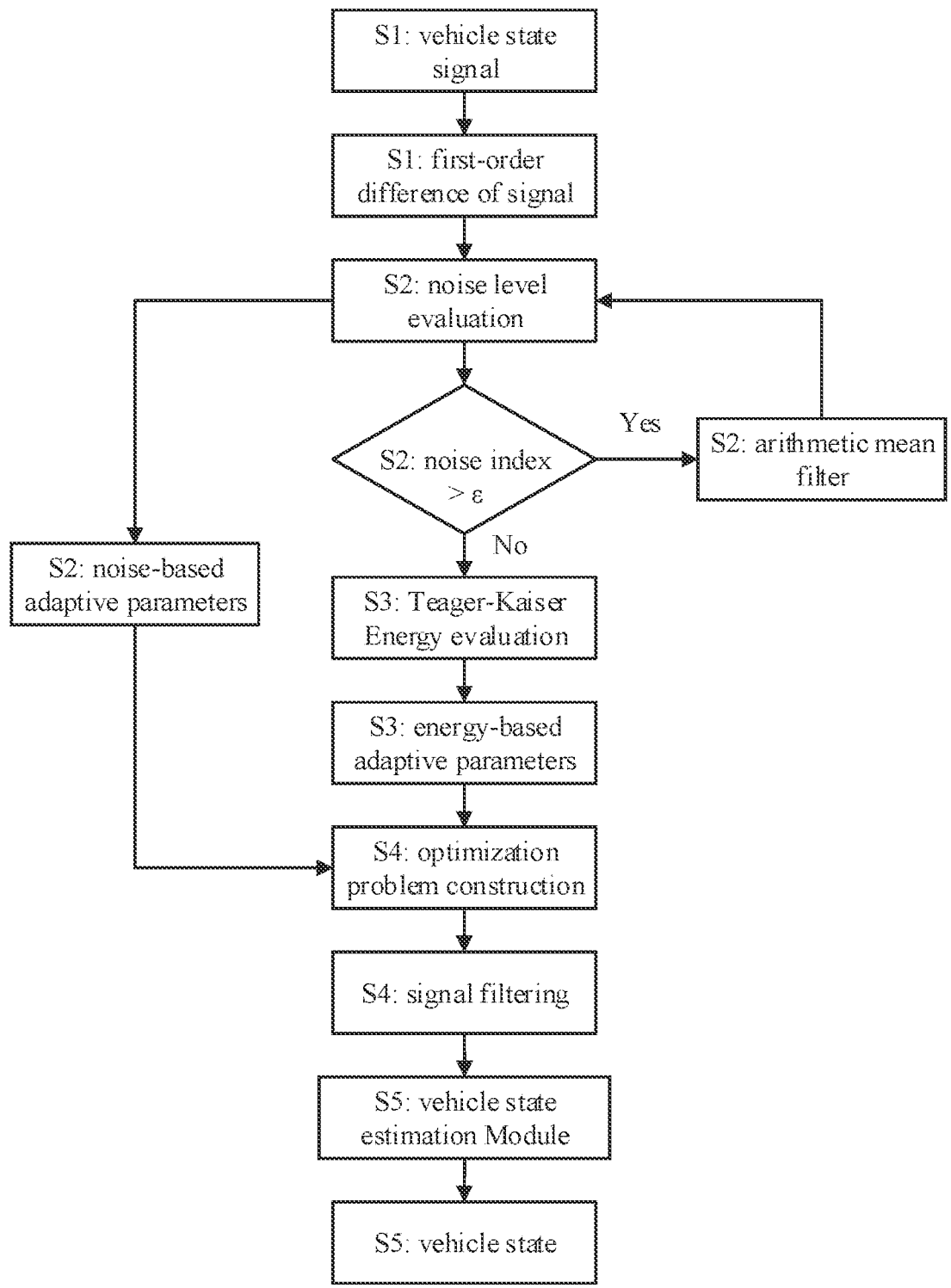
FIG. 1 is a schematic diagram showing the main process according to the present invention.
Figure 2:
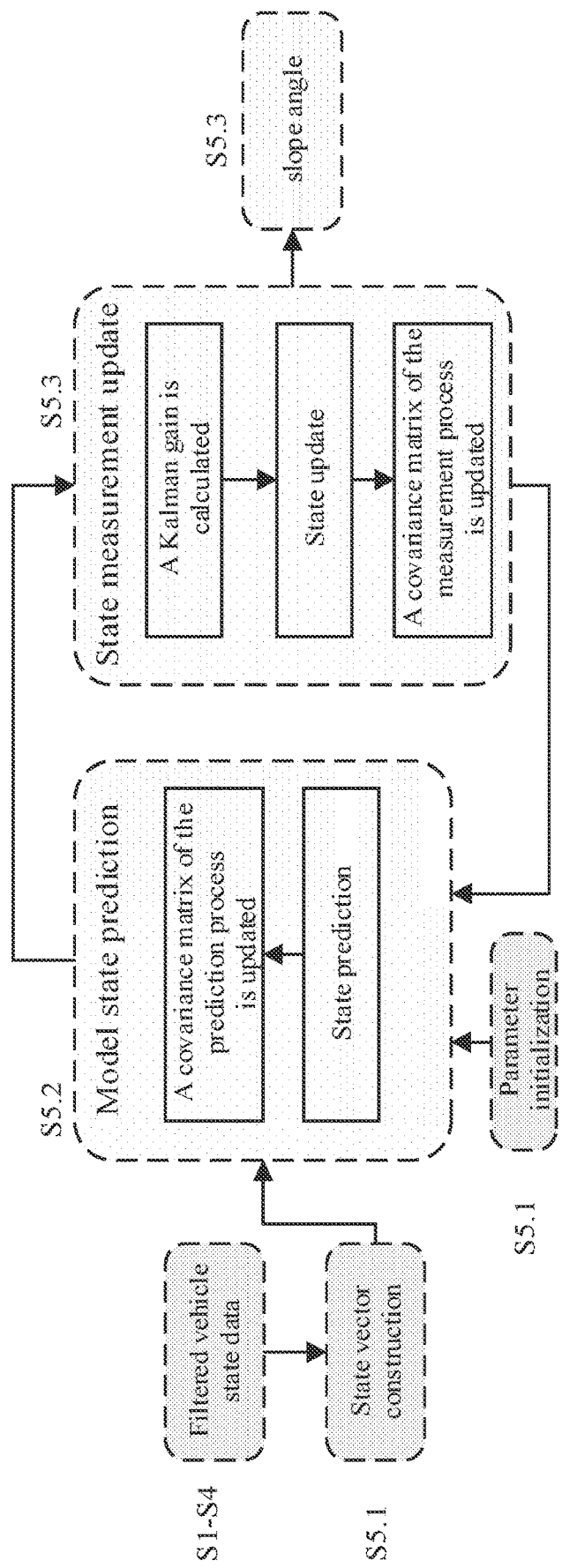
FIG. 2 is a schematic diagram showing the process of step 5 according to the present invention.

The technical solutions provided in the present application will be further described with reference to the following specific examples and the accompanying drawings. The advantages and characteristics of the present application will become more apparent in light of the following description.

Practical mass production vehicles are limited by considerations such as cost, reliability of sensor performance, and the like, with limited numbers and types of sensors. And because of the special configurations of the sprung mass, the suspension and the unsprung mass of the vehicle, the states of a plurality of vehicles cannot be directly measured, and in this case, the state parameters need to be indirectly estimated according to reliable vehicle dynamics parameters through a vehicle dynamics model.

In the present invention, it is assumed that the intrinsic parameters (mass, dimensional parameters, etc.) of the vehicle are known, and the input of the vehicle dynamics parameters by the sensors is relatively complete, so it is necessary to estimate the road slope angle based on the acceleration of the vehicle. The reliability of the acceleration is of vital importance, and if the noise caused by the acceleration is too large, the accuracy and the reliability of the estimation of the slope angle are directly influenced, and the actual control performance of the vehicle is further influenced.

The method specifically includes the following steps:

Part one

Step 1: Collection and Preprocessing of an Original Signal of a Vehicle 1.1. Measurement of Intrinsic Parameters of the Vehicle System Firstly, the gravity G and the mass m of the vehicle and a sampling duration for the signal et are measured and recorded.

1.2. Collection and Preprocessing of a Longitudinal Acceleration and a Longitudinal Speed Signal of the Vehicle During the road slope angle estimation, the input vehicle measurement parameters are the vehicle longitudinal acceleration $a_x$ and the longitudinal speed $v_x$. The longitudinal speed $v_x$ signal is relatively stable, and only simple filtering operation is needed; the longitudinal acceleration a sensor has relatively large noise, is a typical piecewise constant signal, and is very suitable to be filtered by using a total variation method, and the accuracy of the value has great influence on the effectiveness of the vehicle dynamics model. Therefore, the longitudinal acceleration a is selected as a filtering object, and the first-order difference f thereof is obtained by solving, so as to complete the preprocessing process, providing a data source for the filtering processes in the steps 2, 3 and 4.

$$f_1(n) = |a_x(n) - a_x(n-1)|$$

Step 2: Noise Level Evaluation 2.1. Noise Level Evaluation and Noise-Based Adaptive Parameter Solution A second-order difference f Z of the signal is solved according to the first-order difference f of the signal in the step 1.

$$f_2(n) = |f_1(n) - f_1(n-1)|$$

Noise level evaluation is performed on the signal based on the second-order difference of the signal to obtain a noise-based adaptive parameter $K_n$, providing a weight coefficient for a smoothness constraint term in the optimization problem in the step 4.

$$K_n = \sum_{n=0}^{N-1} |f_2(n)|$$

2.2. Noise Index Threshold Setting

A noise index $I_n$ is solved according to the second-order difference $f_2$ of the signal obtained from the noise level evaluation in the step 2.1.

$$I_n = \text{AVG}(|f_2|)$$

wherein AVG represents an averaging function.

To ensure that the noise level of the signal is within an acceptable range for further operation, a noise index threshold c is set. If the noise index exceeds the threshold range, arithmetic mean filter is required to be performed on the signal until the noise index is smaller than the threshold, and then the step 2.1 is re-executed. When the noise index meets the threshold range, it is indicated that the noise evaluation step is completed, and then the step 3 and subsequent operations can be executed.

Step 3: Teager-Kaiser Energy Evaluation 3.1. Teager-Kaiser Energy Evaluation

Compared with the traditional signal energy evaluation method, Teager-Kaiser energy evaluation can comprehensively evaluate the amplitude effect and the frequency characteristic of the signal. The Teager-Kaiser energy is solved according to the first-order difference J of the longitudinal acceleration $a_y$ obtained in the step 1:

$$TKE(f_1(n)) = f_1(n)^2 - f_1(n-1)f_1(n+1)$$

wherein TKE(•) represents a Teager-Kaiser operator.

3.2. Energy-Based Adaptive Parameter Construction

The Teager-Kaiser energy of the signal is solved in the step 3.1, and an energy-based adaptive parameter is constructed in the step.

$$K_e(n) = \frac{1}{TKE(f_1(n))}$$

In practical application, in order to prevent the situation of no solutions in the calculation process, a minimum constant δ is added at the position of the denominator of the above formula, then $$K_e(n) = \frac{1}{TKE(f_1(n)) + \delta}$$

Step 4: Optimization Problem Construction

According to the original vehicle longitudinal acceleration signal $a_x$ obtained in the step 1, wherein it is assumed that $x = a_x$ the noise-based adaptive parameter $$K_n = \sum_{n=0}^{N-1} |f_2(n)|$$

obtained in the step 2, and the energy-based adaptive parameter $$K_e(n) = \frac{1}{TKE(f_1(n)) + \delta}$$

obtained in the step 3, the optimization problem can be constructed based on a TVD process:

$$\arg\min_{y \in R^N}\left\{\frac{1}{2}\sum_{n=0}^{N-1}(x(n)-y(n))^2 + KK_n\sum_{n=1}^{N-1}K_e(n)|y(n)-y(n-1)|\right\}$$

wherein y is the filtered signal, K is a regularization parameter, the first term of the formula is a signal fidelity penalty, the second term is a signal smoothness penalty, and the regularization parameter K is used for achieving the balance between signal fidelity and signal smoothness.

Part two Vehicle state estimation application example:

The filtered signal y in the step 4 is taken as an input of "estimating the road slope angle", and the estimation of the slope angle is performed by using a kalman method, which is considered as an example application in the vehicle state estimation.

The method specifically includes the following steps:

5.1. State Vector Construction and Parameter Initialization

According to the signal y obtained in the steps 1-4 after the vehicle longitudinal acceleration $a_x$ filtering is performed, the selected longitudinal speed $v_x$ of the vehicle and a sine value sinα of the road slope angle, a state vector is constructed as follows:

$$x = |v_x y \sin\alpha|$$

5.2. Model State Update

According to the vehicle intrinsic parameters in the step 1, based on the vehicle dynamics principle, the relationship between the longitudinal acceleration $a_x$, the road slope angle value a and the derivative $\dot{v}_x$ of the longitudinal speed as measured by the sensors can be obtained as follows:

$$a_x = \frac{G}{m}\sin\alpha * \dot{v}_x$$

Then for the sampling duration Δt of the signal, the state transition equation for the system can be written as follows:

$$v_x(k) = v_x(k-1) + \left[a_x(k-1) - \frac{G}{m} \times \sin\alpha(k-1)\right] \cdot \Delta t + w_1(k-1)$$

$$a_x(k) = a_x(k-1) + w_2(k-1)$$

$$\sin\alpha(k) = \sin\alpha(k-1) + w_3(k-1)$$

wherein $w_1(k-1)$, $w_2(k-1)$ and $w_3(k-1)$ are process noise for three state vectors, respectively, and can be set as white Gaussian noise.

(1) A system state predicted value $\tilde{x}_k = [v_x(k)a_x(k)\sin\alpha(k)]$ is predicted at the current moment based on the system state optimal estimation $\hat{x}_{k-1} = [v(k-1)a_x(k-1)\sin\alpha(k-1)]$ at moment k−1:

$$\tilde{x}_k = A\hat{x}_{k-1}$$

wherein the process matrix is set as $$A = \begin{bmatrix} 1 & \Delta t & -\frac{G}{m}\Delta t \\ 0 & 1 & 0 \\ 0 & 0 & 1 \end{bmatrix};$$

the process noise matrix is represented as $$w_{k-1} = \begin{bmatrix} w_1(k-1) \\ w_2(k-1) \\ w_3(k-1) \end{bmatrix}.$$

(2) A covariance matrix $P_k$ of the prediction process is calculated, and the calculation formula is as follows:

$$\overline{P}_k = A P_{k-1} A^H + Q$$

wherein Q is a covariance matrix for the process noise.

5.3. State Measurement Update

In the example, a measurement vector $z_k$ is constructed mainly for the longitudinal acceleration $a_x$ and the longitudinal speed $v_x$ of the vehicle, so an observation equation can be written as follows:

$$z_k = H \cdot x_k + v_k$$

wherein $V_k$ is a measurement noise matrix, and can be set as white Gaussian noise;

$$H = \begin{bmatrix} 1 & 0 & 0 \\ 0 & 1 & 0 \end{bmatrix}$$

is a measurement matrix.

(1) A Kalman gain is calculated, and the calculation formula is as follows:

$$K_k = \overline{P}_k H^T (H \overline{P}_k H^T + R)^{-1}$$

wherein H is the measurement matrix; R is a covariance matrix for the measurement noise $v_k$.

(2) The state $\hat{x}_k$ is updated, and the calculation formula is as follows: wherein $z_k$ represents a measurement variable.

(3) A covariance matrix $P_k$ of the measurement process is updated, and the update formula is as follows:

$$P_k = (1 - K_k H) \overline{P}_k$$

The vehicle state $x_k = [v_x(k)\ a_x(k)\ \text{sink}]$ is output, including an estimated value a of the road slope angle, so as to complete the estimation of the road slope angle, and meanwhile, the vehicle state $x_A$ and the covariance matrix P are output to the step 5.2 for cyclic execution.

The above description is only illustrative of the preferred examples of the present application and is not intended to limit the scope of the present application in any way. Any changes or modifications of the technical contents disclosed above by those of ordinary skills in the art should be considered as equivalent effective examples, and all of the changes or modifications should fall within the protection scope of the technical solutions of the present application.

What is claimed is:

1. A vehicle state estimation method based on adaptive total variation denoising filtering, wherein the method comprises the following steps:

step 1: collection and preprocessing of an original signal of a vehicle, wherein the step 1 comprises:

firstly, for a typical working condition of a vehicle test, collecting, by using sensors, a vehicle speed, an acceleration, a wheel speed, a yaw rate and a motor torque data of the vehicle, meanwhile, solving a first-order difference $f_1$ of a signal P, wherein a solving formula is $f_1(n) = |p(n) - p(n-1)|$, and providing a data source for the subsequent steps 2, 3 and 4;

step 2: noise level evaluation, wherein the step 2 comprises:

2.1, noise level evaluation and noise-based adaptive parameter solution calculating a second-order difference f of the signal according to the first-order difference $f_1$ of the signal in the step 1, wherein a calculation formula is $f_2(n) = |f_1(n) - f_1(n-1)|$, performing noise level evaluation on the signal based on the second-order difference $f_2$ of the signal, wherein an evaluation formula is $$K_n = \sum_{n=0}^{N-1} |f_2(n)|,$$

acquiring a noise-based adaptive parameter $K_K(n)$, and providing a weight coefficient for a smoothness constraint term in an optimization problem in the step 4; and 2.2, noise index threshold setting according to the second-order difference f of the signal in the step 2.1, solving $I_n = \text{AVG}(|f_2|)$ to obtain a noise index L %; setting a threshold E, when the noise index $I_n$ of the signal is greater than the threshold E, performing arithmetic mean filter on the signal, and then re-executing the step 2.1; and if the noise index of the signal is smaller than the threshold e, directly entering the step 3;

step 3: Teager-Kaiser energy evaluation, wherein the step 3 comprises:

according to the signal subjected to the noise level evaluation in the step 2 and having the noise threshold c, comprehensively evaluating an amplitude effect and an instantaneous frequency of the signal by using a Teager-Kaiser energy evaluation method, constructing an energy-based adaptive parameter $$K_e(n) = \frac{1}{TKE(f_1(n))}$$

according to a Teager-Kaiser energy value $TKE(f_1)$, and also providing a weight parameter for a signal smoothness constraint term in the optimization problem in the step 4;

step 4: optimization problem construction, wherein the step 4 comprises:

constructing the optimization problem according to the first-order difference $f_1$ of the signal in the step 1, the noise-based adaptive parameter $K_n$ in the step 2 and the energy-based adaptive parameter $K_e(n)$ in the step 3, and solving the optimization problem to obtain the filtered signal:

$$\arg\min_{y \in R^N} \left\{ \frac{1}{2} \sum_{n=0}^{N-1} (x(n) - y(n))^2 + K K_n \sum_{n=1}^{N-1} K_e(n) |y(n) - y(n-1)| \right\}$$

wherein Y is the filtered signal; K is a regularization parameter; a first term of the formula is a signal fidelity penalty, and a second term of the formula is a signal smoothness penalty; and the regularization parameter K is used for achieving a balance between signal fidelity and signal smoothness; and step 5: application of the filtered signal in the step 4 in an estimation of the vehicle state of the vehicle; and estimating the vehicle state of the vehicle based upon the filtered signal in step 4.

\* \* \* \* \*